(12) United States Patent
Saito et al.

(10) Patent No.: US 10,291,630 B2
(45) Date of Patent: May 14, 2019

(54) MONITORING APPARATUS AND METHOD

(71) Applicant: FUJITSU LIMITED, Kawasaki-shi, Kanagawa (JP)

(72) Inventors: Satomi Saito, Kawasaki (JP); Satoru Torii, Yokohama (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/989,484

(22) Filed: Jan. 6, 2016

(65) Prior Publication Data

US 2016/0248788 A1 Aug. 25, 2016

(30) Foreign Application Priority Data

Feb. 19, 2015 (JP) ................... 2015-030788

(51) Int. Cl.
*H04L 9/00* (2006.01)
*H04L 29/06* (2006.01)

(52) U.S. Cl.
CPC ........ *H04L 63/1416* (2013.01); *H04L 63/083* (2013.01); *H04L 63/1425* (2013.01); *H04L 63/308* (2013.01); *H04L 63/0236* (2013.01); *H04L 63/1466* (2013.01)

(58) Field of Classification Search
CPC .................................................. H04L 63/1416
USPC ......................................................... 726/23
See application file for complete search history.

(56) References Cited

U.S. PATENT DOCUMENTS

| 7,574,202 | B1 | 8/2009 | Tsao et al. |
| 8,312,540 | B1 * | 11/2012 | Kahn ............... G06F 21/552 |
| | | | 713/183 |
| 2005/0188423 | A1 | 8/2005 | Motsinger et al. |

(Continued)

FOREIGN PATENT DOCUMENTS

| EP | 2634989 A1 | 9/2013 |
| JP | 11-143834 | 5/1999 |

(Continued)

OTHER PUBLICATIONS

Extended European Search Report dated Oct. 26, 2016 corresponding to European Patent Application No. 15202905.4, 12 pages.

(Continued)

*Primary Examiner* — Christopher J Brown
(74) *Attorney, Agent, or Firm* — Fujitsu Patent Center

(57) ABSTRACT

A monitoring apparatus, includes a memory configured to store history information regarding a login attempt to a system by a communication apparatus in a state in which a first address is set, the system being a target to be monitored, and set a second address, and a processor coupled to the memory and configured to extract, from the history information, at least one of a variance of a number of login attempts per unit time and a length of a time of the login attempts, determine whether an attack in which accesses are attempted while an address is changed was executed on the system, according to the at least one of the variance and the length of the time, and add the second address of the system to a list that manages systems that had the attack when it is determined that the attack was executed.

18 Claims, 18 Drawing Sheets

(56) References Cited

U.S. PATENT DOCUMENTS

| | | | |
|---|---|---|---|
| 2005/0216955 A1* | 9/2005 | Wilkins | H04L 63/1408 726/23 |
| 2011/0185419 A1* | 7/2011 | Boteler | H04L 63/1425 726/22 |
| 2012/0191855 A1* | 7/2012 | Alexander | G06F 17/30899 709/225 |
| 2013/0067554 A1 | 3/2013 | Alessio et al. | |
| 2013/0160119 A1* | 6/2013 | Sartin | G06F 21/552 726/23 |
| 2014/0059683 A1* | 2/2014 | Ashley | G06F 21/552 726/23 |
| 2015/0026786 A1 | 1/2015 | Alexander | |

FOREIGN PATENT DOCUMENTS

| | | |
|---|---|---|
| JP | 2001-282739 | 10/2001 |
| JP | 2013-531285 | 8/2013 |
| WO | 2014/202718 A1 | 12/2014 |

OTHER PUBLICATIONS

Honda et al., "Detection of Novel-Type Brute Force Attacks Used Expendable Springboard IPs as Camouflage", Computer Security Symposium (CSS2013), Oct. 21-23, 2013, pp. 302-309, Oct. 2013. English Abstract (8 pages).

Partial European Search Report dated Jul. 20, 2016 for corresponding European Patent Application No. 15202905.4, 7 pages.

Japanese Office Action dated Oct. 9, 2018 for corresponding Japanese Patent Application No. 2015-030788 with English Translation, 6 pages.

Ohwada, Hidenari et al., "Network-based Intrusion Detection Model", Technical Report of IEICE, The Institute of Electronics Information and Communication Engineers, vol. 101, No. 715, pp. 73-80, Mar. 8, 2002, with English Abstract, Cited in JPOA dated Mar. 12, 2019 for corresponding Japanese Patent Application No. 2015-030788.

Japanese Office Action dated Mar. 12, 2019 for corresponding Japanese Patent Application No. 2015-030788, with English Translation, 7 pages.

* cited by examiner

FIG. 6A

| No. | ATTACK SOURCE IP ADDRESS | ATTACK DESTINATION IP ADDRESS | DETECTION TIME | LOGIN ATTEMPT COUNT |
|---|---|---|---|---|
| 1 | srcIP10 | dstIP10 | JANUARY 1, 2014 AT 0:00 | 10 |
| 2 | srcIP10 | dstIP10 | JANUARY 1, 2014 AT 0:01 | 10 |
| 3 | srcIP10 | dstIP10 | JANUARY 1, 2014 AT 0:02 | 10 |
| 4 | srcIP11 | dstIP11 | JANUARY 1, 2014 AT 0:02 | 12 |
| 5 | srcIP10 | dstIP10 | JANUARY 1, 2014 AT 0:03 | 10 |
| ⋮ | ⋮ | ⋮ | ⋮ | ⋮ |
| m | srcIP13 | dstIP10 | JANUARY 1, 2014 AT 0:15 | 10 |
| m+1 | srcIP14 | dstIP12 | JANUARY 1, 2014 AT 0:15 | 50 |
| m+2 | srcIP13 | dstIP10 | JANUARY 1, 2014 AT 0:16 | 10 |
| ⋮ | ⋮ | ⋮ | ⋮ | ⋮ |

FIG. 6B

| EX No. | srcIP | TOTAL LT OF LOGIN ATTEMPTS | VARIANCE VL OF LOGIN ATTEMPTS | DURATION TIME DT IN LOGIN ATTEMPT DETECTION |
|---|---|---|---|---|
| 1 | srcIP1 | 50 | 0.25 | 10 MINUTES |
| 2 | srcIP2 | 100 | 1.2 | 11 MINUTES |
| 3 | srcIP3 | 63 | 100 | 3 MINUTES |
| ⋮ | ⋮ | ⋮ | ⋮ | ⋮ |

FIG. 6C

| PTN No. | TOTAL LT OF LOGIN ATTEMPTS | VARIANCE VL OF LOGIN ATTEMPTS | DURATION TIME DT IN LOGIN ATTEMPT DETECTION |
|---|---|---|---|
| 1 | 50 | 0.25 | 10 MINUTES |
| 2 | 250 | 0.25 | 25 MINUTES |
| 3 | 200 | 0.2 | 20 MINUTES |
| 4 | 75 | 0.3 | 15 MINUTES |
| ⋮ | ⋮ | ⋮ | ⋮ |

FIG. 6D

| COUNTERMEASURE-DEMANDING dstIP | ATTACK PATTERN No. |
|---|---|
| dstIP1 | 1 |
| dstIP2 | 1 |
| dstIP5 | 3 |
| ⋮ | ⋮ |

| srcIP | BLOCKING START TIME STc | BLOCKING TERMINATION TIME FTc |
|---|---|---|
| srcIP21 | JANUARY 1, 2014 AT 23:50 | JANUARY 2, 2014 AT 0:20 |
| srcIP25 | JANUARY 2, 2014 AT 0:05 | JANUARY 2, 2014 AT 0:20 |
| srcIP26 | JANUARY 2, 2014 AT 0:10 | JANUARY 2, 2014 AT 1:10 |
| ⋮ | ⋮ | ⋮ |

123

MONITORING APPARATUS AND METHOD

CROSS-REFERENCE TO RELATED APPLICATION

This application is based upon and claims the benefit of priority of the prior Japanese Patent Application No. 2015-030788, filed on Feb. 19, 2015, the entire contents of which are incorporated herein by reference.

FIELD

The technology disclosed in this embodiment is related to a technology that monitors network attacks.

BACKGROUND

Services that use the Internet include services that use authentication based on user ID and a password. In this type of services, brute force attacks (also referred to below as "BF attacks") in which the user ID and password of another person are illegally gained are viewed as a problem.

A BF attack is an attack to access a communication apparatus such as a server that provides services and attempt an authentication (login) by using combinations of imaginable user IDs and passwords. This attempt is continued until the authentication succeeds. Therefore, if a communication apparatus has a BF attack, not only the user ID and password of a normal user are illegally gained but also a problem such as the occurrence of a failure due to an increase in a processing load of a server or the like arises.

As one countermeasure against BF attacks, there is a method of detecting communication (access) that is highly likely to be a BF attack by applying an intrusion detection system (IDS).

In the detection of a BF attack by using the IDS, in a case in which, for example, an access pattern from a first IP address to a communication apparatus with a second IP address is similar to a pattern at the time of a BF attack, the presence or absence of similar accesses from the first IP address to communication apparatuses with other IP addresses is checked. Then, if it is detected that accesses in patterns similar to the pattern at the time of a BF attack were performed from the first IP address to a plurality of communication apparatuses with different IP addresses at times of the day that are almost the same, it is decided that a BF attack in which the first IP address is a transmission source (attack source) was performed.

As for this type of BF attack, the advent of a BF attack in a new form was reported in a recent year in which false detection by an IDS is disguised. For example, a form was reported in which the number of login attempts from one IP address and the frequency of attacks is reduced and login attempts (BF attack) are performed while the IP address is changed (see Satomi Honda, Yuki Unno, Koji Maruhashi, Masahiko Takenaka, Satoru Torii, "Detection of Novel-Type Brute Force Attacks Used Expendable Springboard IPs as Camouflage", "Computer Security Symposium (CSS2013), 2013, for example).

SUMMARY

According to an aspect of the invention, an apparatus includes a monitoring apparatus, includes a memory configured to store history information regarding a login attempt to a system by a communication apparatus in a state in which a first address is set, the system being a target to be monitored, and set a second address, and a processor coupled to the memory and configured to extract, from the history information, at least one of a variance of a number of login attempts per unit time and a length of a time of the login attempts, determine whether an attack in which accesses are attempted while an address is changed was executed on the system, according to the at least one of the variance and the length of the time, and add the second address of the system to a list that manages systems that had the attack when it is determined that the attack was executed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is a schematic diagram that illustrates an example of the data structure of a BF detection log, FIG. 6B is a schematic diagram that illustrates an example of the data structure of extraction information, FIG. 6C is a schematic diagram that illustrates an example of the data structure of a login control-type BF attack pattern list, and FIG. 6D is a schematic diagram that illustrates an example of the data structure of a countermeasure-demanding dstIP list;

FIG. 8 is a schematic diagram that illustrates an example of the data structure of an srcIP black list;

DESCRIPTION OF EMBODIMENTS

BF attacks that have been found so far and against which countermeasures have been taken, including BF attacks in a form in which a BF attack is performed while the IP address is changed, handle a plurality of communication apparatuses as targets to attack. Therefore, an intrusion detection system and the like determine that a BF attack is being performed in a case in which login attempts are being attempted for a plurality of communication apparatuses (IP addresses) by using one IP address at times of the day that are almost the same.

However, as a result of a recent investigation by the inventors in this application, a BF attack in a new form that has not been seen so far was confirmed in which only one communication apparatus (IP address) is handled as a target to attack.

In a BF attack in this new form, a login to one IP address is attempted by using one IP address. Therefore, it is unable to detect a BF attack according to login attempt patterns, described above, at a plurality of communication apparatuses (IP addresses).

Furthermore, in a BF attack in the new form, the number of login attempts performed by using one IP address and the their frequency are reduced and login attempts to one IP address that is a target to attack are intermittently repeated while the IP address is changed. Therefore, the number of login attempts from individual IP addresses and their frequency are similar to the number of login attempts by the normal user that involve login failures and the frequency of login attempts. Thus, it is difficult to determine whether or not these login attempts are a BF attack.

In one aspect, an object of the present disclosure is to detect, at an early stage, a network attack that is intermittently performed for one IP address while the IP address is changed.

(About Brute Force Attacks)

First, an IP expending-type brute force attack and a login control-type brute force attack, which are addressed by the present disclosure, will be described with reference to FIGS. 1 and 2.

Incidentally, in the explanation below, a brute force attack will also be referred to as a BF attack and an IP expending-type brute force attack and a login control-type brute force attack will also be respectively referred to as an IP expending-type BF attack and a login-control BF attack.

In the explanation below, "srcIP" and "srcIPm (m is an arbitrary integer)" indicate the IP address of a side (attack source) that performs a BF attack, that is, the IP address of a transmission source in a packet in a login attempt. Similarly, "dstIP" and "dstIPm (m is an arbitrary integer)" indicate the IP address of a side (attack destination) that has a BF attack, that is, the IP address of a transmission destination in a packet in a login attempt.

Figure 1:
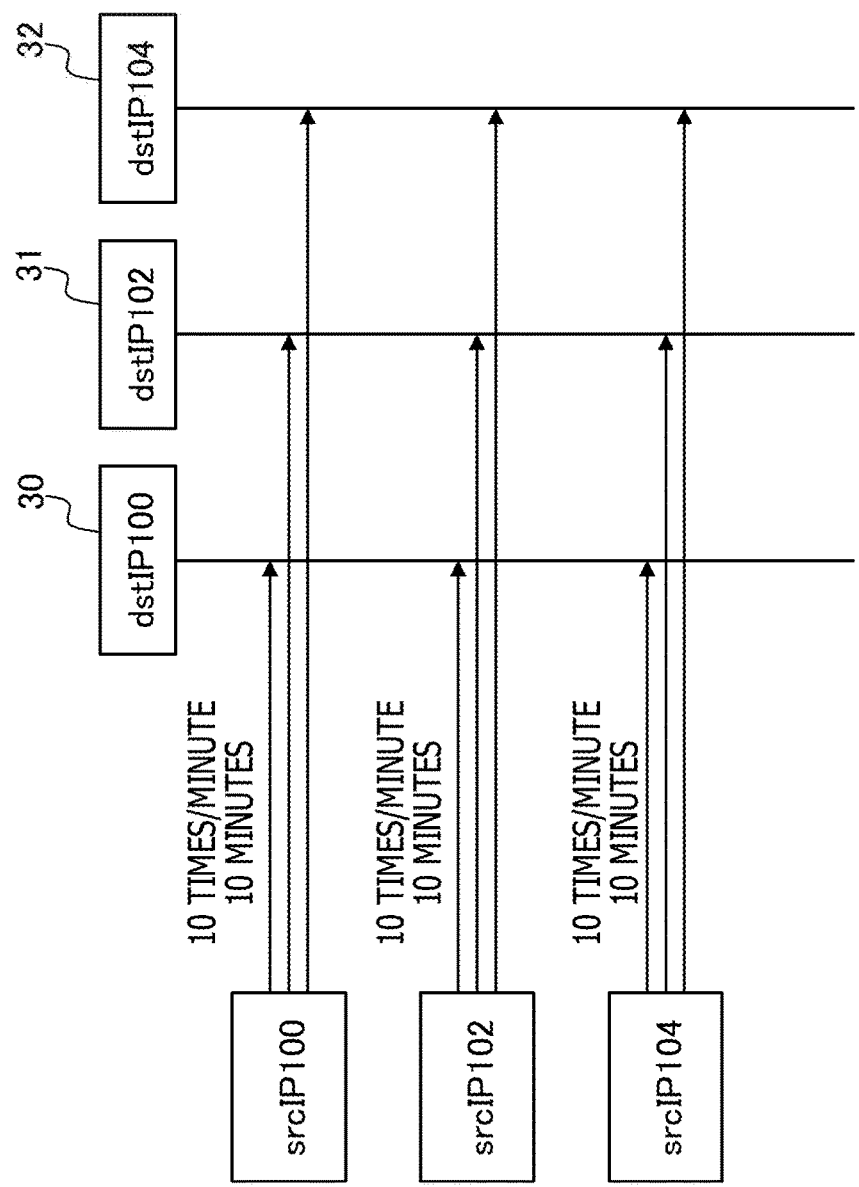
FIG. 1 is a sequence diagram that explains an example of an IP expending-type brute force attack.

FIG. 1 is a sequence diagram that explains an example of an IP expending-type brute force attack.

The IP expending-type BF attack is a BF attack in a new form, which was found by the inventors in this application in a recent year; login attempts are repeated for a communication apparatus at an attack destination while the IP address (srcIP) of the attack source is periodically changed.

In the IP expending-type BF attack, as illustrated in, for example, FIG. 1, login attempts are first repeated for a plurality of communication apparatuses 100, 101, and 102, which are targets to attack, by using "srcIP100" as the IP address of the transmission source. That is, a login attempting packet with "dstIP100" set as the transmission destination, a login attempting packet with "dstIP102" set as the transmission destination, and a login attempting packet with "dstIP104" set as the transmission destination, are repeatedly transmitted.

After that, the IP address of the transmission source is changed to "srcIP102" and login attempts are repeated for the plurality of communication apparatuses 100, 101, and 102.

After that, the IP address of the transmission source is further changed to "srcIP104" and login attempts are repeated for the plurality of communication apparatuses 100, 101, and 102.

After that as well, login attempts are repeated for the plurality of communication apparatuses 100, 101, and 102 while the IP address of the transmission source is changed In the IP expending-type BF attack, to avoid detection by an intrusion detection system (IDS) or an intrusion prevention system (IPS), the number of login attempts for each communication apparatus with one transmission source IP address (srcIP) is reduced. In the example illustrated in FIG. 1, login attempts from one transmission source IP address is continued for 10 minutes at a frequency of 10 times per minute, after which the transmission source IP address is changed.

In the IP expending-type BF attack illustrated in FIG. 1, login attempts, by the normal user, that involve login failures are imitated by reducing the number of login attempts for one communication apparatus with one transmission source IP address. However, in this type of IP expending-type BF attack, one transmission source IP address is used to concurrently perform login attempts for a plurality of communication apparatuses as in a BF attack that is performed without changing the IP address. Therefore, login attempts with the same attempt pattern are detected at the plurality of communication apparatuses. If the transmission source IP address is the same, a BF attack can be detected by the IDS or IPS.

However, it was found from a further investigation by the inventors in this application that IP expending-type BF attacks include an attack form that is difficult to detect by a detection method, as described above, that is based on login attempt patterns at a plurality of communication apparatuses.

In the attack form that the inventors in this application newly found, only one communication apparatus (dstIP) is handled as a target to attack and login attempts are repeated for it. This type of attack will be referred to below as the login control-type BF attack.

Figure 2:
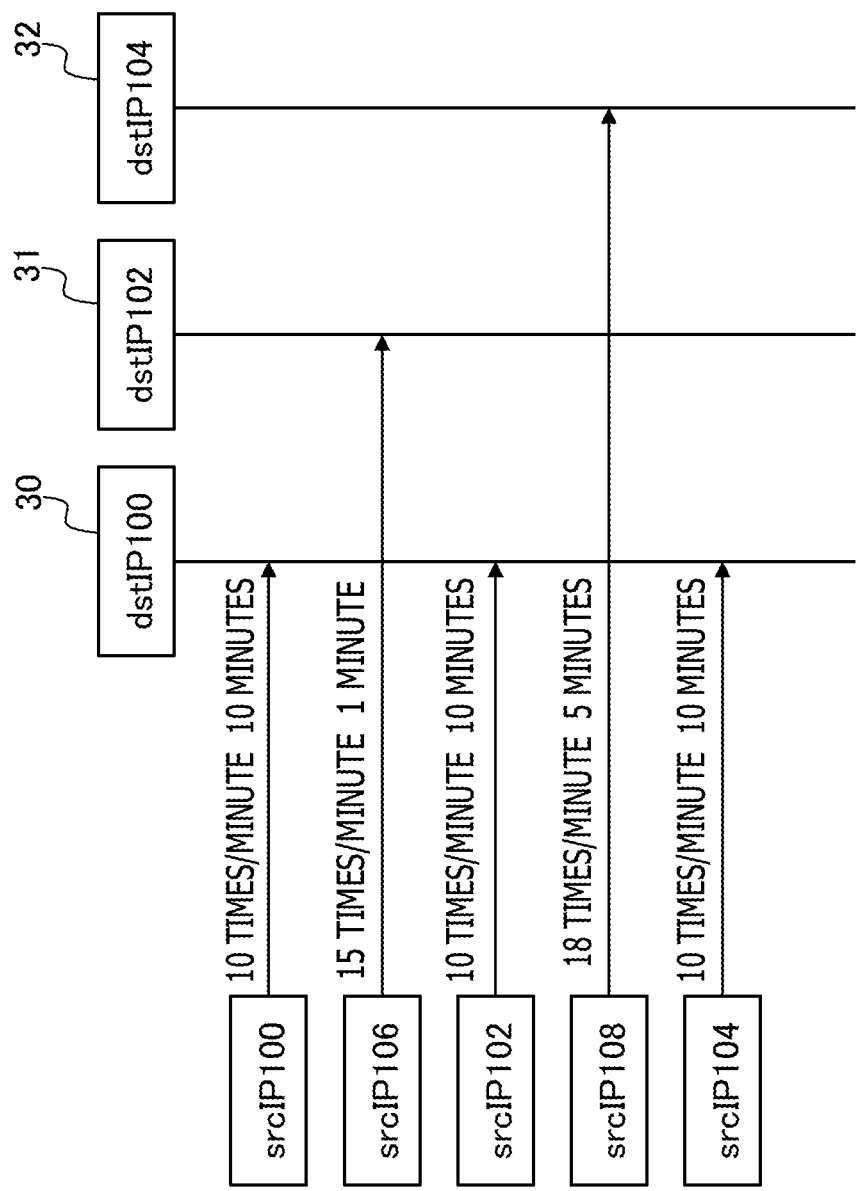
FIG. 2 is a sequence diagram that explains a login control-type brute force attack according to the present disclosure.

FIG. 2 is a sequence diagram that explains a login control-type brute force attack according to the present disclosure.

The login control-type BF attack is an IP expending-type BF attack in which only one communication apparatus (dstIP) is handled as a target to attack and login attempts are repeated for it, as described above.

In the login control-type BF attack, an external communication apparatus that is an attack source first, for example, repeats only login attempts for the communication apparatus 100, which a target to attack, for 10 minutes at a frequency of 10 times per minute by using "srcIP100" as the IP address of the transmission source, as illustrated in FIG. 2.

After that, the external communication apparatus that is an attack source changes the IP address of the transmission source to "srcIP102" and repeats only login attempts for the communication apparatus 100 for 10 minutes at a frequency of 10 times per minute.

After that, the external communication apparatus that is an attack source further changes the IP address of the transmission source to "srcIP104" and repeats only login attempts for the communication apparatus 100 for 10 minutes at a frequency of 10 times per minute.

After that as well, the external communication apparatus that is an attack source repeats only login attempts for the communication apparatus 100 for 10 minutes at a frequency of 10 times per minute while changing the IP address of the transmission source.

While the external communication apparatus that is an attack source is repeating login attempts for the communication apparatus 100 in this way, other external communication apparatuses may perform login attempts for the communication apparatuses 101, 102, and the like. The other external communication apparatuses perform, for example, a login attempt for the communication apparatus 101 with "srcIP106" set as the IP address of the transmission source and a login attempt for the communication apparatus 102 with "srcIP108" set as the IP address of the transmission source, as illustrated in FIG. 2.

There is no correlation between attempt patterns in the login attempts with "srcIP106" and "srcIP108" set as the IP address of the transmission source and attempt patterns in login attempts by the external communication apparatus that is an attack source.

Therefore, in a case in which an IP expending-type BF attack is being performed only for one communication apparatus (dstIP), that is, in a case in which a login control-type BF attack is being performed, it is difficult to detect an attack by making a comparison with patterns in login attempts by other communication apparatuses.

The present disclosure makes it possible to detect an IP expending-type BF attack as described above at an early stage and take countermeasures.

First Embodiment

Figure 3:
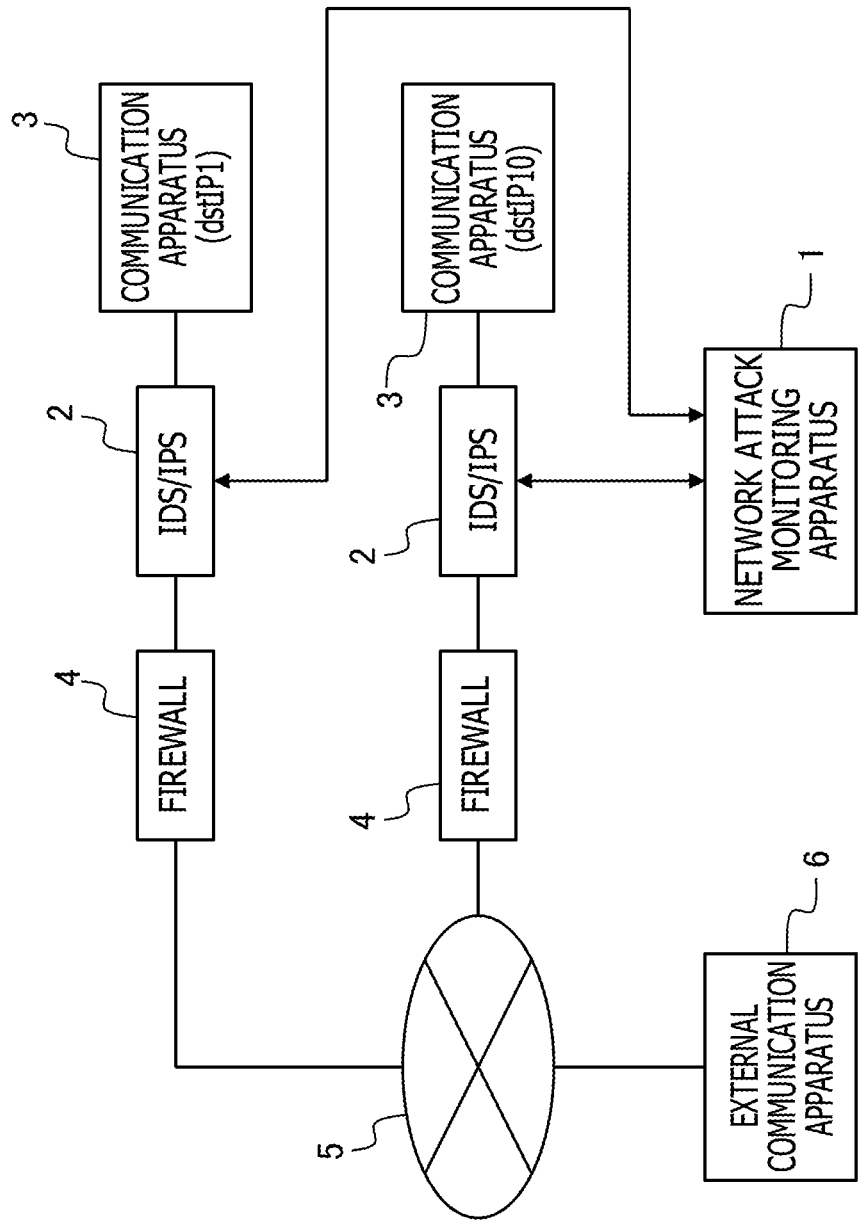
FIG. 3 is a schematic diagram that explains an example in which a network attack monitoring apparatus according to the present disclosure is applied.

FIG. 3 is a schematic diagram that explains an example in which a network attack monitoring apparatus according to the present disclosure is applied.

As illustrated in FIG. 3, a network attack monitoring apparatus 1 according to the present disclosure performs detection, monitoring, and the like for a login control-type BF attack on a communication apparatus 3, which is a target to be monitored, in cooperation with an intrusion detection system/intrusion prevention system (IDS/IPS) 2.

The communication apparatus 3, which is a target to be monitored, is connected to a communication network 5 such as the Internet through a firewall device 4. This communication apparatus 3 provides services in which authentication by the use of a user ID and a password is used. Therefore, the firewall device 4 passes a packet for a login attempt, the packet having been transmitted from an external communication apparatus 6 to the communication apparatus 3.

The intrusion detection system/intrusion prevention system 2 monitors packets forwarded from the firewall device 4 to the communication apparatus 3 and detects an illegal intrusion or a network attack and makes a defense against it.

The network attack monitoring apparatus 1 according to the present disclosure detects a login control-type BF attack by using an access history (for example, a BF detection log) or the like accumulated in the intrusion detection system/intrusion prevention system 2. The network attack monitoring apparatus 1 also causes the intrusion detection system/intrusion prevention system 2 to block communication from an srcIP (external communication apparatus) that is performing a login control-type BF attack for a certain period.

(Structure of the Apparatus)

Figure 4:
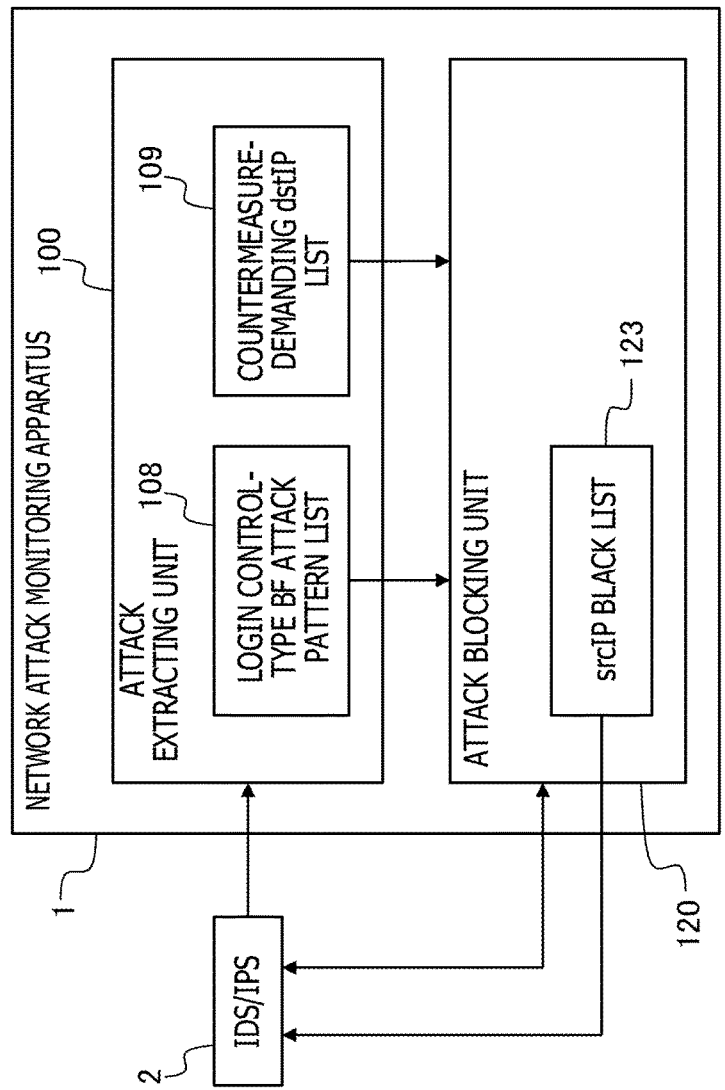
FIG. 4 is a schematic diagram that illustrates an example of the structure of a network attack monitoring apparatus according to a first embodiment of the present disclosure.

FIG. 4 is a schematic diagram that illustrates an example of the structure of the network attack monitoring apparatus according to the first embodiment of the present disclosure.

The network attack monitoring apparatus 1 in this embodiment has an attack extracting unit 100 and an attack blocking unit 120, as illustrated in FIG. 4.

The attack extracting unit 100 extracts a communication apparatus 3 that had a login control-type BF attack in the past (or is highly likely to have had an attack) by using the access history (BF detection log) acquired from the intrusion detection system/intrusion prevention system 2 and a login control-type BF attack pattern list 108.

The attack extracting unit 100 also registers the IP address (dstIP) of the extracted communication apparatus 3 in a countermeasure-demanding dstIP list 109.

By contrast, the attack blocking unit 120 checks whether or not there is a communication apparatus 3 that has a login control-type BF attack at present by using BF attack detection information acquired from the intrusion detection system/intrusion prevention system 2, the login control-type BF attack pattern list 108, and the countermeasure-demanding dstIP list 109.

Also, if the attack blocking unit 120 determines that there is a communication apparatus 3 that has a login control-type BF attack, the attack blocking unit 120 registers the IP address (srcIP) of the attack source of the login control-type BF attack and a blocking period in the communication from the srcIP in an srcIP black list 123.

Then, the intrusion detection system/intrusion prevention system 2 references the srcIP black list 123 and blocks the communication in which the srcIP registered in the list is the transmission source for a certain period.

(Structure of the Attack Extracting Unit)

Figure 5:
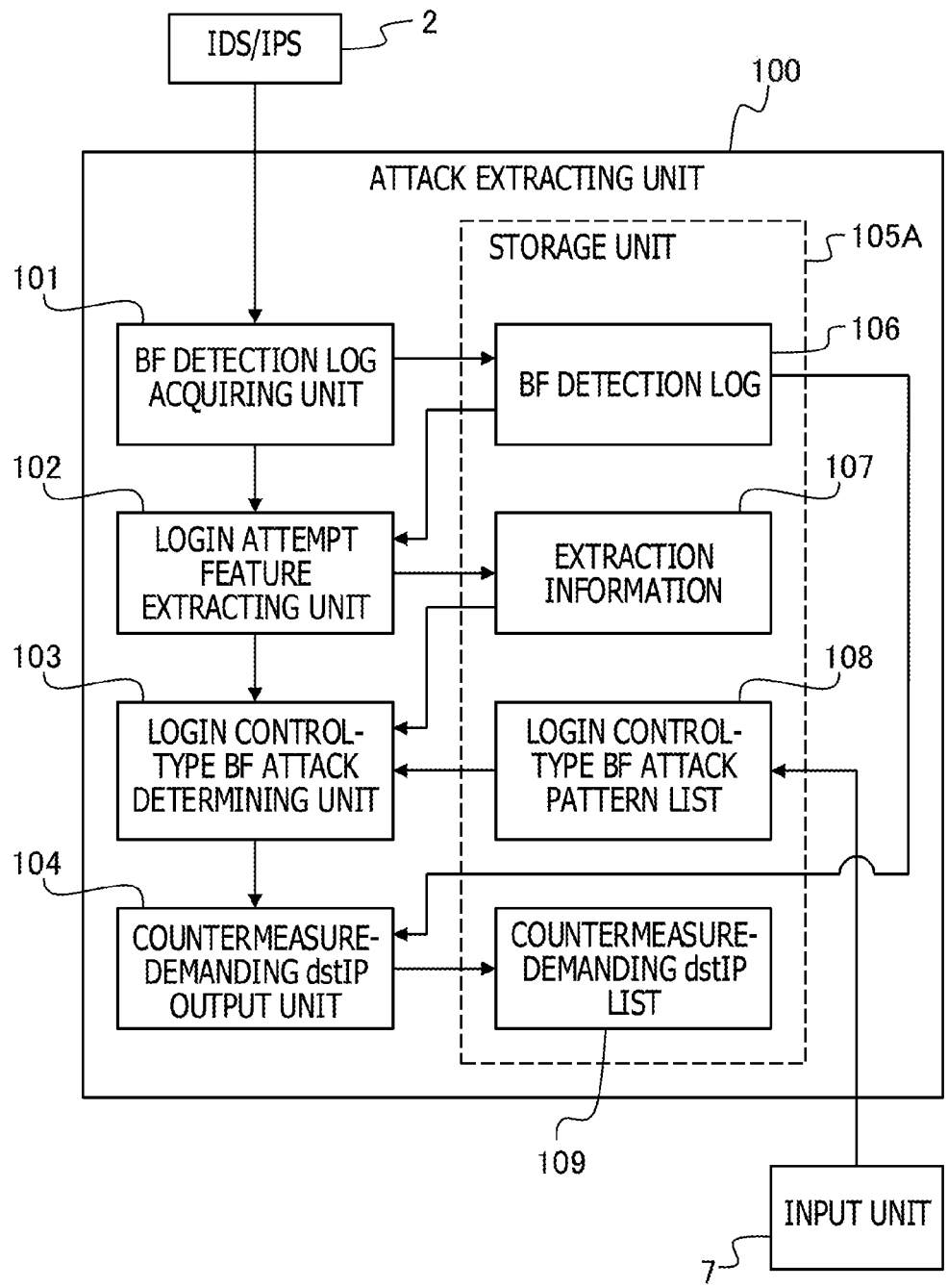
FIG. 5 is a schematic diagram that illustrates an example of the structure of an attack extracting unit in the network attack monitoring apparatus according to the first embodiment.

FIG. 5 is a schematic diagram that illustrates an example of the structure of the attack extracting unit in the network attack monitoring apparatus according to the first embodiment.

The attack extracting unit 100 has a BF detection log acquiring unit 101, a login attempt feature extracting unit 102, a login control-type BF attack determining unit 103, a countermeasure-demanding dstIP output unit 104, and a storage unit 105A, as illustrated in FIG. 5. A BF detection log 106, extraction information 107, the login control-type BF attack pattern list 108, and the countermeasure-demanding dstIP list 109 are stored in the storage unit 105A. The storage unit 105A may be one memory or two or more memories.

The BF detection log acquiring unit 101 acquires a BF detection log accumulated in the intrusion detection system/intrusion prevention system 2 and stores the log in the storage unit 105A.

By using the BF detection log 106 in the storage unit 105A, the login attempt feature extracting unit 102 extracts the feature of a login attempt for each IP address (srcIP) from which the communication apparatus 3, which is a target to be monitored, was accessed, after which the login attempt feature extracting unit 102 stores the feature in the storage unit 105A as the extraction information 107.

By using the extraction information 107 and login control-type BF attack pattern list 108 in the storage unit 105A, the login control-type BF attack determining unit 103 determines whether or not there is an attack source IP address (srcIP) that has been used in a login control-type BF attack. Here, the login control-type BF attack pattern list 108 is, for example, a list of login control-type BF attack patterns (login attempt patterns) obtained by analyzing previous BF detection logs or a list of attack patterns reported by third parties. The manager of the network attack monitoring apparatus 1 or another person updates this login control-type BF attack pattern list 108 at any time by using an input unit 7. Also, a service provider that provides security services in which the network attack monitoring apparatus 1 is used, for example, may update the login control-type BF attack pattern list 108 and may distribute the updated login control-type BF attack pattern list 108 to individual network attack monitoring apparatuses 1.

The countermeasure-demanding dstIP output unit 104 registers, in the countermeasure-demanding dstIP list 109 in the storage unit 105A, the IP address (dstIP) of the communication apparatus 3 that had a login attempt from the srcIP used in a login control-type BF attack and the feature of the login attempt.

FIG. 6A is a schematic diagram that illustrates an example of the data structure of a BF detection log. FIG. 6B is a schematic diagram that illustrates an example of the data structure of extraction information. FIG. 6C is a schematic diagram that illustrates an example of the data structure of a login control-type BF attack pattern list. FIG. 6D is a schematic diagram that illustrates an example of the data structure of a countermeasure-demanding dstIP list.

The BF detection log 106 that the BF detection log acquiring unit 101 acquires is a history of accesses that were determined to be a BF attack in the intrusion detection system/intrusion prevention system 2. The BF detection log 106 includes, for example, attack source IP addresses, attack destination IP addresses, detection times of day, and login attempt counts, as illustrated in FIG. 6A.

The attack source IP address is the transmission source IP address of a packet that was determined to correspond to a BF attack on the communication apparatus 3, which is a target to be monitored. The attack destination IP address is the transmission destination IP address of a packet that was determined to correspond to a BF attack. The detection time of day is a time of the day at which a BF attack was detected. In the example illustrated in FIG. 6A, a date (year, month, day) and a time of the day (hours, minutes) are recorded. The login attempt count is the number of login attempts from the attack source IP address to the attack destination IP address.

In the example illustrated in FIG. 6A, login attempts in which "srcIP10" is the transmission source IP address and "dstIP10" is the transmission destination IP address were repeated ten times per minute for several minutes from Jan. 1, 2014 at 0:00. Also, after that, login attempts in which "srcIP13" is the transmission source IP address and "dstIP10" is the transmission destination IP address were repeated ten times per minute for several minutes from Jan. 1, 2014 at 0:15. Therefore, the communication apparatus assigned "dstIP10" is likely to have had a BF attack.

However, each of the login attempts in which srcIP10 and srcIP13 are the transmission source IP address is performed only for dstIP10. Therefore, each of these login attempts can also be considered as a separate login attempt by the normal user, so it is difficult to determine only from the BF detection log 106 whether or not the login attempt is a BF attack.

In view of this, in this embodiment, a login attempt feature is extracted from the BF detection log 106 for each transmission source IP address (attack source IP address), makes a comparison with the login control-type BF attack pattern list 108, and determines whether or not the login attempt is a BF attack.

Login attempts in a login control-type BF attack have the following two features. A first feature is that a time taken for login attempts performed from one srcIP is fixed. A second feature is that the number of login attempts in a unit time is fixed.

From these, the following three can be said for a group of a plurality of srcIPs involved in a series of login control-type BF attacks on one dstIP. A first is that a duration time of login attempts with each srcIP is almost the same. A second is that the total of login attempts in login attempts with each srcIP is almost the same. A third is that variance of the number of login attempts in a unit time in login attempts with each srcIP is almost the same.

Therefore, in this embodiment, a duration time DT in login attempt detection, a total LT of login attempts, and a variance VL of login attempts are used as the features of login attempts, and the extraction information 107 as illustrated in FIG. 6B is created. That is, the extraction information 107 includes attack source IP addresses (srcIPs), totals LT of login attempts from the relevant srcIPs, variances VL of the number of login attempts, and duration times DT in login attempt detection.

The duration time DT in login attempt detection is a time during which login attempts from one srcIP to one dstIP were consecutively detected. In a case in which an interval between times of the day at which login attempts from one srcIP to one dstIP were detected is equal to or shorter than a preset time threshold, this duration time DT is accumulated, assuming that these login attempts are consecutive login attempts. For example, in a case in which, with the time threshold being two minutes, when a login attempt for a certain dstIP is detected from 0:00 to 0:01 and a time of the day at which a next login attempt for the same dstIP was detected is 0:01, these login attempts are assumed to be consecutive login attempts. Also, for example, in a case in which, with the time threshold being two minutes, when a login attempt for a certain dstIP is detected from 0:00 to 0:01 and a time of the day at which a next login attempt for the same dstIP was detected is 0:04, these login attempts are assumed to be separate login attempts.

The total LT of login attempts is a total of login attempts that have been consecutively performed from one srcIP to one dstIP. For example, in a case in which ten login attempts per minute continued for 15 minutes, the total of login attempts is 150. Also, for example, in a case in which login attempts that continued for five minutes are 10 login attempts in one minute, nine login attempts in one minute, 11 login attempts in one minute, 10 login attempts in one minute, and nine login attempts in one minute, the total of login attempts is 49.

The variance VL of login attempts is a variance of login attempts in a unit time that were consecutively performed from one srcIP to one dstIP.

In a login control-type BF attack, the number of login attempts performed in a unit time (for example, one minute) is fixed, and seven to eight login attempts per minute, for example, are performed for 30 minutes from one srcIP. Therefore, in the case of a login control-type BF attack, the variance VL of login attempts becomes a small value.

The login control-type BF attack pattern list 108 to be compared with this extraction information 107 includes pattern (PTN) Nos., the totals LT of login attempts, the variances VL of the number of login attempts, and the duration times DT in login attempt detection, as illustrated in FIG. 6C.

The total LT of login attempts, variance VL of login attempts, and duration time DT in login attempt detection in one pattern are calculated according to one attack form of login control-type BF attacks that were detected or found in the past.

If, in the extraction information 107, there is a login attempt feature that matches a pattern registered in the login control-type BF attack pattern list 108, a login attempt from an srcIP corresponding to the login attempt feature can be said to be a login control-type BF attack. An IP address (dstIP) that had a login control-type BF attack is highly likely to have a login control-type BF attack after that as well. Therefore, an IP address (dstIP) that had a login control-type BF attack is registered in the countermeasure-demanding dstIP list 109 and is monitored with an emphasis on the IP address. A dstIP to be registered in the countermeasure-demanding dstIP list 109 is identified by using, for example, an srcIP that is likely to be involved in a login control-type BF attack and the BF detection log 106 illustrated in FIG. 6A.

The countermeasure-demanding dstIP list 109 includes countermeasure-demanding dstIPs and attack pattern Nos. as illustrated in FIG. 6D. The countermeasure-demanding dstIP is an IP address that was determined to have had a login control-type BF attack. The attack pattern No. is the number (PTN No.) of a login control-type BF attack pattern that matches a login attempt feature in the extraction information 107, the login control-type BF attack pattern being one of attack patterns registered in the login control-type BF attack pattern list 108.

In the example illustrated in FIG. 6D, it is indicated that the communication apparatuses at dstIP1 and dstIP2 had a login control-type BF attack at attack pattern No. 1. It is also indicated that the communication apparatus at dstIP5 had a login control-type BF attack at attack pattern No. 3. It is highly likely that the dstIPs registered in this countermeasure-demanding dstIP list 109 will have a login control-type BF attack after that as well.

In the attack blocking unit 120, therefore, it is monitored whether or not a login attempt at attack pattern No. 1 is being performed for dstIP1 and dstIP2, whether or not a login attempt at attack pattern No. 3 is being performed for dstIP5, and the like. If a relevant attack pattern is detected, an srcIP used in an attack (login attempts) is registered in the black list and communication from the srcIP is blocked for a certain period.

As described above, by using a login attempt feature in a login control-type BF attack, a communication apparatus (dstIP) that had a login control-type BF attack can be easily identified.

In addition, by registering a dstIP that had a login control-type BF attack and a login attempt feature in the countermeasure-demanding dstIP list 109 and monitoring accesses to the registered dstIP with an emphasis on it, it is possible to detect subsequent login control-type BF attacks at an early stage.

(Structure of the Attack Blocking Unit)

Figure 7:
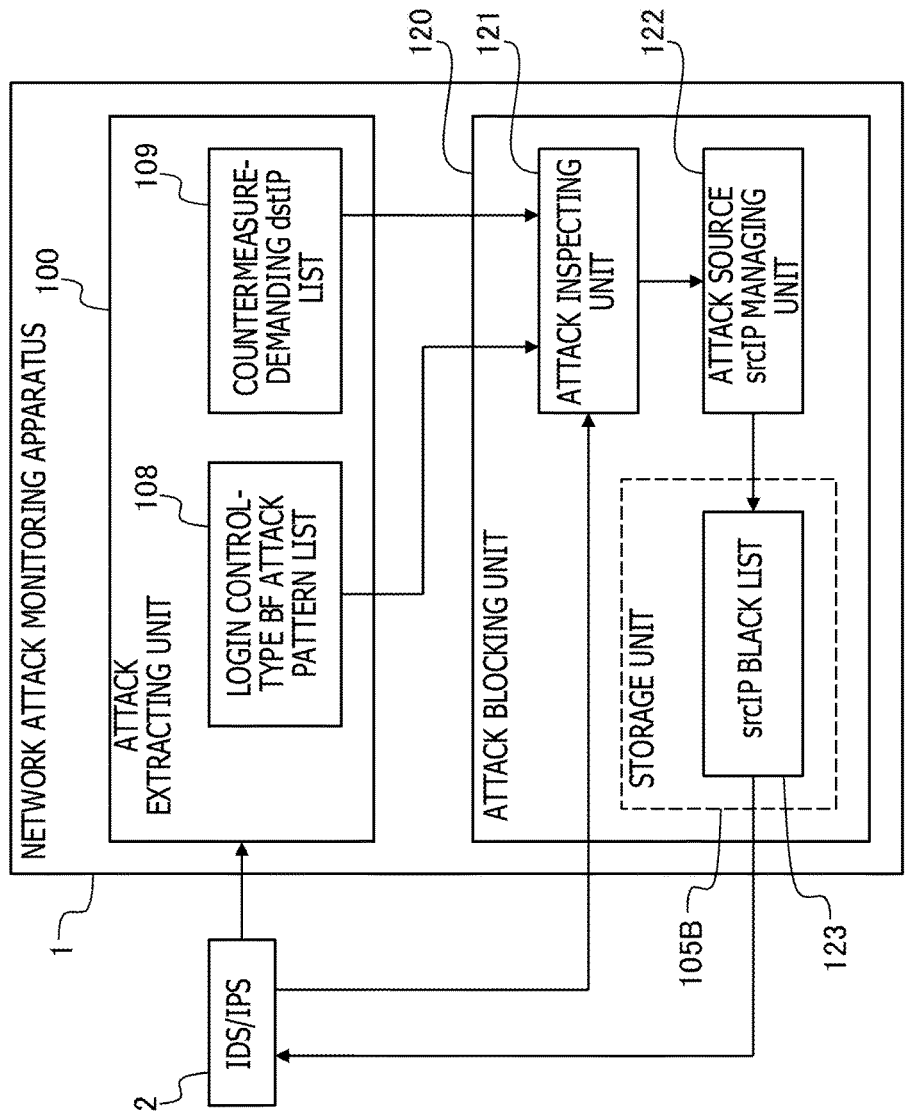
FIG. 7 is a schematic diagram that illustrates an example of the structure of an attack blocking unit in the network attack monitoring apparatus according to the first embodiment.

FIG. 7 is a schematic diagram that illustrates an example of the structure of the attack blocking unit in the network attack monitoring apparatus according to the first embodiment.

The attack blocking unit 120 has an attack inspecting unit 121, an attack source srcIP managing unit 122, and a storage unit 105B, as illustrated in FIG. 7. The srcIP black list 123 is stored in the storage unit 105B. Incidentally, the storage unit 105B may be a memory combined with the storage unit 105A in the attack extracting unit 100 or a memory provided separately from the storage unit 105A.

When the attack inspecting unit 121 receives detection information indicating that a BF attack from the intrusion detection system/intrusion prevention system 2 was detected, the attack inspecting unit 121 inspects whether or not, in the dstIPs registered in the countermeasure-demanding dstIP list 109, there is a dstIP that has a login control-type BF attack at present.

Also, when the attack inspecting unit 121 detects that there is a dstIP that has a login control-type BF attack at present, the attack inspecting unit 121 identifies an attack pattern according to the countermeasure-demanding dstIP list 109 and login control-type BF attack pattern list 108.

According to the identified attack pattern, the attack source srcIP managing unit 122 calculates a blocking period in the communication in which an srcIP that is performing login control-type BF attack and registers the srcIP and the blocking period in the srcIP black list 123.

Also, the attack source srcIP managing unit 122 references the srcIP black list 123 according to, for example, a preset schedule and deletes, from the srcIP black list 123, an srcIP for which a blocking termination time of the day has elapsed.

FIG. 8 is a schematic diagram that illustrates an example of the data structure of the srcIP black list.

As illustrated in FIG. 8, the srcIP black list 123 includes srcIPs for which a login attempt (access) for the communication apparatus 3, which is a target to be monitored, is blocked, blocking start times of day STc, and blocking termination times of day FTc.

The srcIP for which a login attempt is to be blocked is the IP address of a transmission source (attack source) that is being used in a login attempt that matches a dstIP and attack pattern No. registered in the countermeasure-demanding dstIP list 109, that is, a login control-type BF attack.

The blocking start time of day STc is, for example, a time of the day at which detection information from the intrusion detection system/intrusion prevention system 2 was received. Also, the blocking start time of day STc may be, for example a time of the day at which an srcIP started a login control-type BF attack in detection information received from the intrusion detection system/intrusion prevention system 2.

The blocking termination time of day FTc is set according to the blocking start time of day STc and the duration time DT in login attempt detection in the login control-type BF attack pattern list 108 corresponding to a login control-type BF attack in which an srcIP is used.

If, for example, the duration time DT in login attempt detection is 20 minutes, login attempts for one dstIP in which one srcIP is used are terminated in 20 minutes.

Therefore, if the duration time DT in a login control-type BF attack that is being performed by srcIP21 illustrated in FIG. 8 is 20 minutes, at a time of 30 minutes after the time of the day at which an attack from srcIP21 was detected, the attack from srcIP21 has been terminated. Thus, the blocking termination time of day FTc for srcIP21 is set to a time of 30 minutes after the blocking start time of day STc.

As described above, the blocking termination time of day FTc is set so that the blocking period is equal to the duration time DT in login attempt detection in a login control-type BF attack pattern corresponding to a login control-type BF attack in which an srcIP is used or is longer than the duration time DT by several minutes to ten-odd minutes.

Also, the srcIP black list 123 is updated by the attack source srcIP managing unit 122 at any time. When a login control-type BF attack is detected, the attack source srcIP managing unit 122 registers, in the srcIP black list 123, the srcIP that has been used in the attack, and deletes, from the srcIP black list 123, srcIPs for which the blocking termination time of day FTc has elapsed.

Then, the intrusion detection system/intrusion prevention system 2 references the srcIP black list 123 as illustrated in FIG. 8 and blocks login attempts from the srcIP registered in the list only for a certain period.

As described above, if it is detected that a BF attack is being performed for a dstIP registered in the countermeasure-demanding dstIP list 109, the BF attack can be blocked at an early stage by blocking login attempts from the srcIP that is being used in the BF attack. Therefore, damage due to the BF attacks can be suppressed to a minimum. For example, in the case of a login control-type brute force attack in which eight login attempts in which one srcIP is used are performed per minute for 30 minutes, if it is not possible to detect the attack, the communication apparatus (dstIP), which is a target to attack, will have 240 login attempts (eight login attempts/minutes×30 minutes). By contrast, if communication from the srcIP used in the attack can be blocked for one hour by applying the network attack monitoring apparatus 1 in this embodiment, starting five minutes after the attack was detected, login attempts can be blocked about six minutes after the attack start time of the day. Therefore, about 192 login attempts (eight login attempts/minute×24 minutes), that is, about 80% of the login control-type brute force attack that the communication apparatus would otherwise have can be suppressed.

Also, by registering the blocking termination time of day FTc as well in the srcIP black list 123 and deleting, from the srcIP black list 123, srcIPs for which the blocking termination time of day FTc has elapsed, it is possible to suppress an explosive increase in the number of srcIPs for which an attack is to be blocked. Therefore, it is possible to suppress the occurrence of damage due to an increase in a processing load on the intrusion detection system/intrusion prevention system 2 and the like.

(Processing Performed by the Attack Extracting Unit)

Figure 9A:
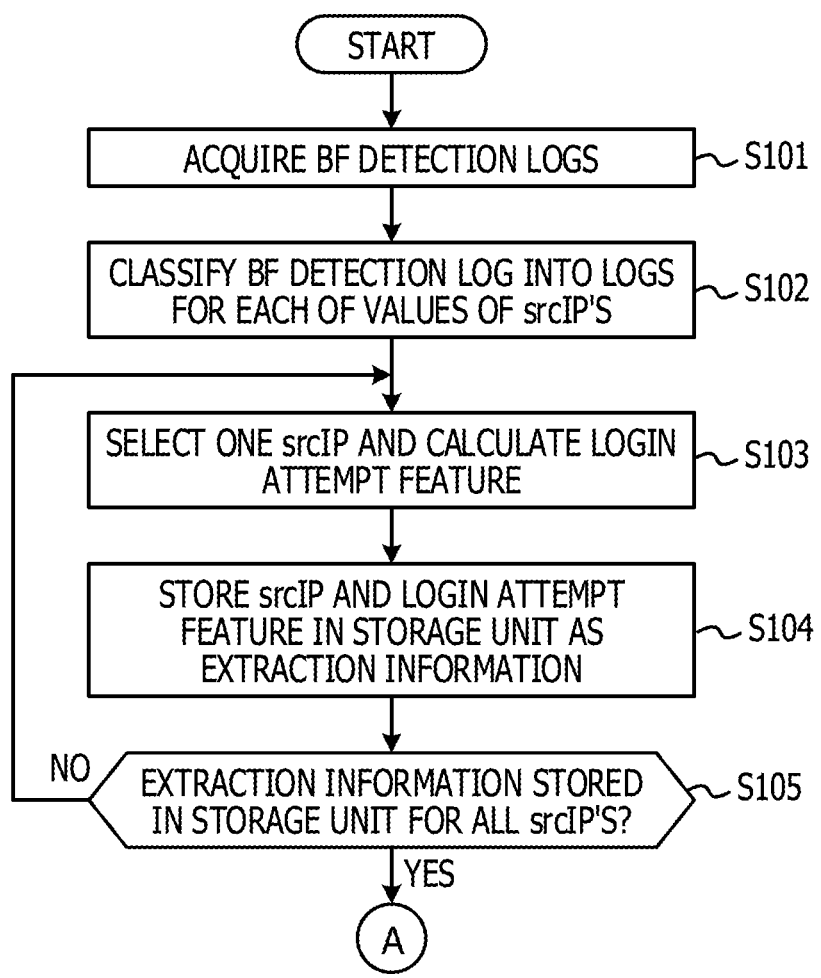
FIGS. 9A and 9B are a flowchart that illustrates processing performed by the attack extracting unit in the network attack monitoring apparatus according to the first embodiment.
Figure 9B:
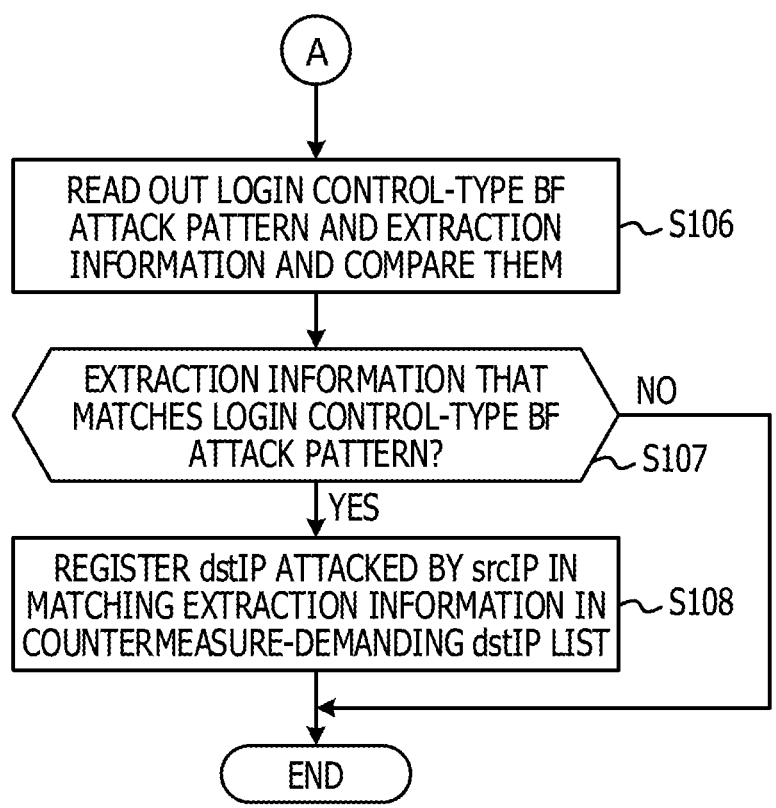

FIG. 9A is a flowchart (1) that illustrates processing performed by the attack extracting unit in the network attack monitoring apparatus according to the first embodiment. FIG. 9B is a flowchart (2) that illustrates processing performed by the attack extracting unit in the network attack monitoring apparatus according to the first embodiment.

The attack extracting unit 100 repeatedly executes processing as illustrated in FIGS. 9A and 9B according to a preset schedule.

In this case, in the attack extracting unit 100, the BF detection log acquiring unit 101 first acquires the BF detection logs 106 from the intrusion detection system/intrusion prevention system 2 and stores the BF detection logs 106 in the storage unit 105A (step S101).

Next, the login attempt feature extracting unit 102 reads out the BF detection logs 106 in the storage unit 105A and classifies the BF detection logs 106 into logs for each of the values of the IP addresses (srcIPs) of communication sources (step S102).

Next, the login attempt feature extracting unit 102 selects one srcIP in the classified logs and calculates a login attempt feature (step S103). In this case, out of the srcIPs, the login attempt feature extracting unit 102 selects an srcIP for which a login attempt feature has not been calculated. As the login attempt feature, the login attempt feature extracting unit 102 also calculates the total LT of login attempts, the variance VL of login attempts, and the duration time DT in login attempt detection as illustrated in FIG. 5B.

Next, the login attempt feature extracting unit 102 associates the selected srcIP and calculated login attempt feature with each other and stores them in the storage unit 105A as the extraction information 107 (step S104). Incidentally, in a case in which a loop from steps S103 to S105 is a second time or later and the extraction information 107 is already stored in the storage unit 105A, the selected srcIP and calculated login attempt feature are added to the extraction information 107.

Upon the termination of the processing in step S104, the login attempt feature extracting unit 102 then checks whether extraction information has been stored in the storage unit 105A for all srcIPs (step S105). If there is an srcIP for which extraction information has not been stored (step S105; No), the processing returns to step S103.

After extraction information has been stored in the storage unit 105A for all srcIPs (step S105; Yes), the login control-type BF attack determining unit 103 then reads out the login control-type BF attack pattern list 108 and extraction information 107 and compares them (step S106). In this case, the login control-type BF attack determining unit 103 compares login attempt features in the login control-type BF attack pattern list 108 and login attempt features in the extraction information 107 and selects extraction information that has a match in features.

Incidentally, in step S106, only extraction information in which values representing a login attempt feature match values in the login control-type BF attack pattern list 108 may be selected. Alternatively, extraction information in which differences from values in the login control-type BF attack pattern list 108 are equal to or smaller than predetermined thresholds may be regarded as matching extraction information and may be selected.

In the latter case, when extraction information in which the total LT and variance VL of login attempts and the duration time DT in login attempt detection are, for example, respectively 49, 0.25, and 10 minutes is compared with the login control-type BF attack pattern list 108 illustrated in FIG. 6C, the extraction information can be selected as an attack at No. 1. Therefore, it is possible to reduce the possibility that a login control-type BF attack is missed due to fluctuations, in login attempt features, that are caused by a deviation in times of the day in the apparatus or the like.

Upon the termination of the processing in step S106, the login control-type BF attack determining unit 103 then decides whether or not there is extraction information that matches the login control-type BF attack pattern list 108 (step S107). If there is no matching extraction information (step S107; No), it is determined that there is no login control-type BF attack and processing is terminated.

By contrast, if there is matching extraction information (step S107; Yes), the IP address (dstIP) that had a BF attack in which the srcIP in the matching extraction information is used is registered in the countermeasure-demanding dstIP list 109 (step S108).

As described above, by calculating a login attempt feature for each srcIP (attack source IP address) in the BF detection log 106 and comparing the login attempt feature with login control-type BF attack patterns, even if only one IP address (dstIP) had a login control-type BF attack, the IP address can be identified.

(Processing Performed by the Attack Blocking Unit)

Figure 10:
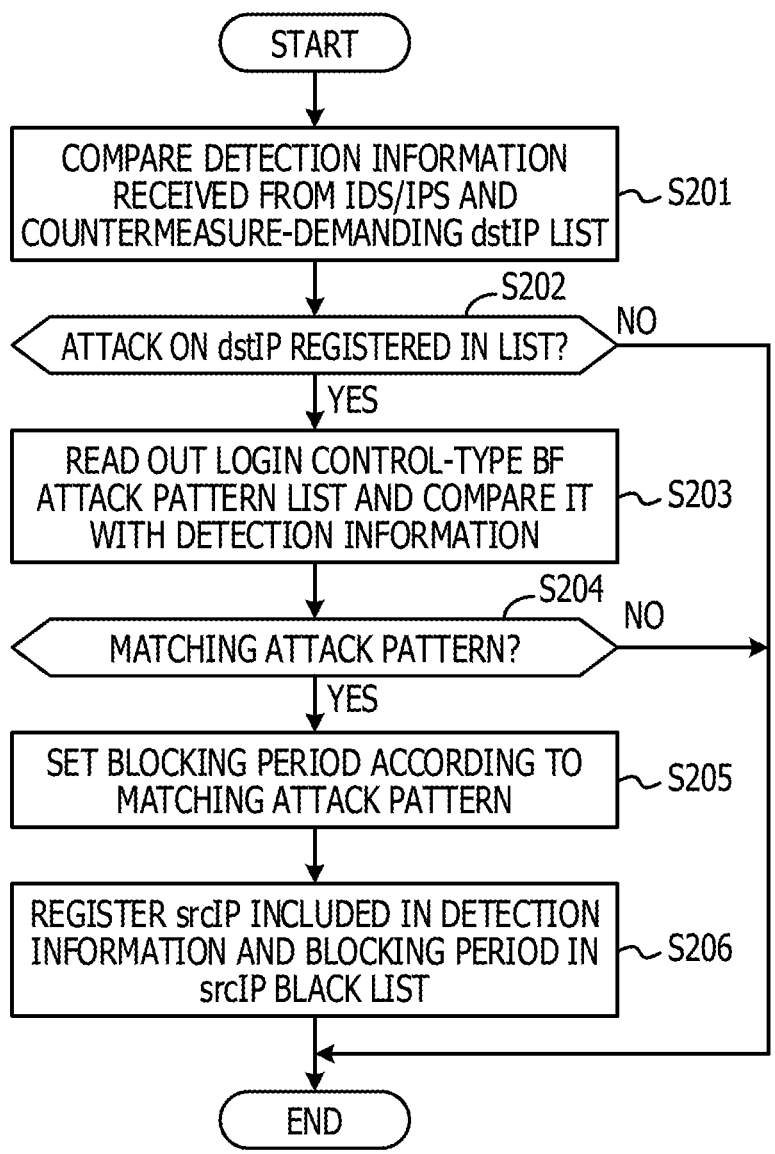
FIG. 10 is a flowchart that illustrates processing performed by the attack blocking unit.

FIG. 10 is a flowchart that illustrates processing performed by the attack blocking unit.

When the intrusion detection system/intrusion prevention system 2 detects a BF attack, the intrusion detection system/intrusion prevention system 2 transmits, to the attack blocking unit 120, detection information that includes, for example, an attack source IP address, an attack destination IP address, a detection time of day, and a login attempt count, as in the BF detection log 106 illustrated in FIG. 6A. When the attack blocking unit 120 receives, from the intrusion detection system/intrusion prevention system 2, detection information indicating that a BF attack has been detected, the attack blocking unit 120 performs processing as illustrated in FIG. 10.

In this case, in the attack blocking unit 120, the attack inspecting unit 121 first compares detection information received from the intrusion detection system/intrusion prevention system (IDS/IPS) 2 and the countermeasure-demanding dstIP list 109 (step S201). The attack inspecting unit 121 compares dstIPs in the countermeasure-demanding dstIP list 109 and the attack destination IP address included in the detection information, and selects the dstIP that matches the attack destination IP address and the attack pattern No. associated with the dstIP.

Upon the termination of the processing in step S201, the attack inspecting unit 121 then decides whether or not the BF attack in the detection information is a BF attack (login attempt) on a dstIP registered in the countermeasure-demanding dstIP list 109 (step S202). If the BF attack is not a BF attack (login attempt) on a dstIP registered in the countermeasure-demanding dstIP list 109 (step S202; No), the attack is decided not to be a login control-type BF attack and the processing is terminated.

By contrast, if the BF attack is a BF attack on a dstIP registered in the countermeasure-demanding dstIP list 109 (step S202; Yes), the attack inspecting unit 121 then reads out the login control-type BF attack pattern list 108 and compares it with the detection information (step S203). In this case, the attack inspecting unit 121 calculates, for example, the number of login attempts per minute in each attack pattern in the login control-type BF attack pattern list 108, and compares the calculated number with the number of login attempts per minute in the detection information. If there is an attack pattern including the number of login attempts per minute that matches the number of login attempts per minute in the detection information, the attack inspecting unit 121 also reads out the pattern No. of the attack pattern.

Upon the termination of the processing in step S203, the attack inspecting unit 121 checks whether or not there is an attack pattern that matches the detection information (step S204). If there is no matching attack pattern (step S204; No), the login attempt for the dstIP is determined not to be a login control-type BF attack and the processing is terminated.

By contrast, if there is a matching attack pattern (step S204; Yes), the attack source srcIP managing unit 122 then sets a blocking period according to the matching attack pattern (step S205). In this case, the attack source srcIP managing unit 122 sets the blocking period to a time equal to or longer than the duration time DT in login attempt detection in the login control-type BF attack pattern list 108.

After having set the blocking period, the attack source srcIP managing unit 122 registers the srcIP and blocking period in the srcIP black list 123 in correspondence to each other (step S206). In this case, the attack source srcIP managing unit 122 takes, for example, a time of the day at which the detection information was received as the blocking start time of day STc, calculates the blocking termination time of day FTc according to the blocking start time of day STc and blocking period, and registers the blocking termination time of day FTc in the srcIP black list 123 as illustrated in FIG. 8.

As described above, in a case in which a login attempt similar to a BF attack is detected, by comparing the feature of the login attempt, the countermeasure-demanding dstIP list 109, and login control-type BF attack pattern list 108, it is possible to decide whether or not the login attempt is a login control-type BF attack. In this case, if the number of login attempts per minute is used as a feature of the login attempt, it is possible to decide at an early stage whether or not the login attempt is a login control-type BF attack.

For, for example, a BF attack in which 10 login attempts are performed per minute for 10 minutes from one srcIP, if it is detected in first two minutes that there is a BF attack and it is found that the BF attack is a login control-type BF attack, it is possible to block the attack in the remaining time of about eight minutes.

As described above, according to this embodiment, it is possible to detect and block, at an early stage, a login control-type BF attack, that is, a BF attack that is performed for one IP address (dstIP) while the IP address (srcIP) of the attack source is changed.

Also, by setting the blocking termination time of day FTc as illustrated in FIG. 8 in the srcIP black list 123, which is used to block a login control-type BF attack, after the attack from a detected srcIP has been terminated, the blocking of login attempts from the srcIP can be cancelled in succession. Therefore, even in a case in which a BF attack is intermittently performed for one dstIP while the srcIP is changed, it is possible to suppress an explosive increase in the number of srcIPs for which login attempts are to be blocked. Therefore, it is possible to suppress an increase in a processing load on the intrusion detection system/intrusion prevention system 2 and the like and also suppress the occurrence of damage accompanying the increased processing load and the like.

(Hardware Structure)

Figure 11:
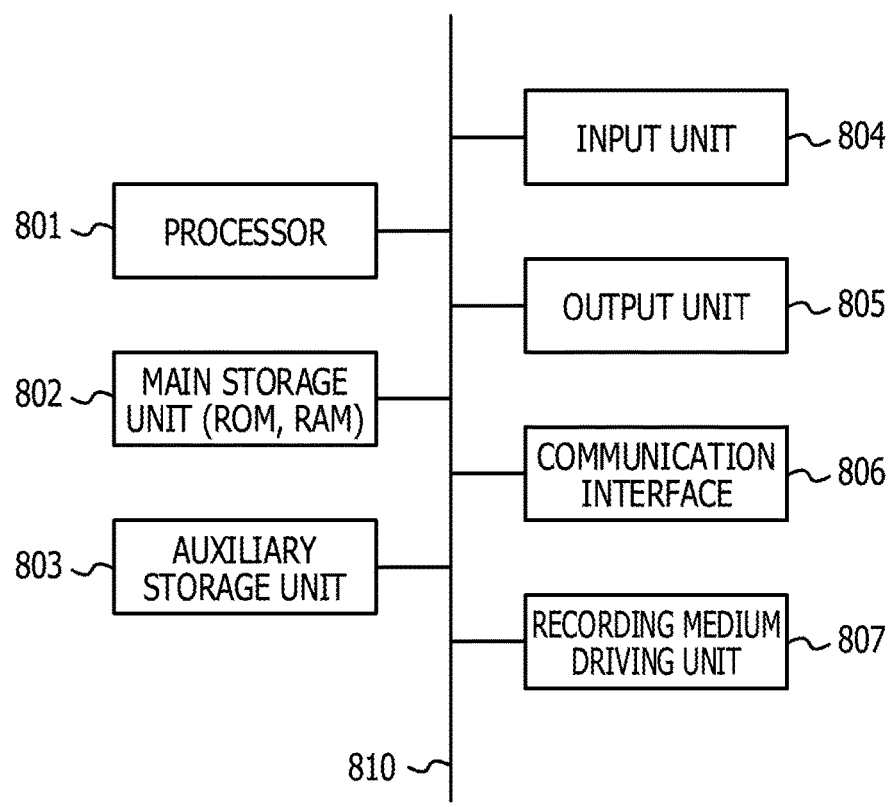
FIG. 11 is a schematic diagram that illustrates the hardware structure of a computer used as the network attack monitoring apparatus.

FIG. 11 is a schematic diagram that illustrates the hardware structure of a computer used as the network attack monitoring apparatus.

The network attack monitoring apparatus 1 according to this embodiment is implemented by a computer and programs that cause the computer to execute processing as illustrated in FIGS. 9A, 9B, and 10.

As illustrated in FIG. 11, a computer 8 has a processor 801, a main storage unit 802, an auxiliary storage unit 803, an input unit 804, an output unit 805, a communication interface 806, and a recording medium driving unit 807. These elements in the computer 8 are mutually connected by a bus 810, enabling data to be transmitted and received among the elements.

The processor 801 is an arithmetic processing apparatus, such as a central processing unit (CPU) or a micro-processing unit (MPU), that controls the entire operations of the computer 8 by executing various programs.

The main storage unit 802 is semiconductor memories such as a read only memory (ROM) and a random access memory (RAM). In the ROM, a predetermined basic control program and the like that are read out by the processor 801 at a time at which the computer 8 is started up, for example, are stored in advance. Also, when the processor 801 executes various programs, the RAM is used as a work storage area on an as-demanded basis.

The auxiliary storage unit 803 is a storage unit with a large capacity when compared with the main storage unit 802, which is a hard disk drive (HDD), a solid state disk (SSD), or the like. In the auxiliary storage unit 803, various programs (for example, programs corresponding to the above processing) executed by the processor 801 and various data (for example, the BF detection log 106, login control-type BF attack pattern list 108, and the like) are stored. The processor 801 reads out and executes programs stored in the auxiliary storage unit 803 and also reads out various data stored in the auxiliary storage unit 803 on an as-demanded basis.

The input unit 804 is, for example, a keyboard device and a mouse device. When the input unit 804 is operated by the operator of the computer 8, the input unit 804 transmits input information associated with the operation to the processor 801.

The output unit 805 is, for example, a liquid crystal display. The output unit 805 displays various texts, pictures, and like according to display data transmitted from the processor 801.

The communication interface 806 connects the computer 8 and the communication network 5 such as the Internet so that they can mutually communicate and performs communication with an external communication apparatus and the like through the communication network 5.

The recording medium driving unit 807 reads out programs and data recorded in a transportable recording medium, which is not illustrated, and records data and the like stored in the auxiliary storage unit 803 in the transportable recording medium. As the transportable recording medium, a flash memory with a USB-standard connector, for example, can be used. Also, as the transportable recording medium, an optical disc such as a compact disk (CD), a digital versatile disc (DVD), or a Blu-ray disc (Blu-ray is a registered trademark) can be used.

In this computer 8, the processor 801, main storage unit 802, auxiliary storage unit 803, and the like cooperate according to predetermined programs and perform processing such as the extraction of a login control-type BF attack as described above, creation of the srcIP black list 123, and the like.

As described above, according to the first embodiment of the present disclosure, the feature of an access is extracted for each IP address (srcIP) of an external communication apparatus that has accessed the communication apparatus 3, according to the access history (BF detection log 106) for the communication apparatus 3, which is a target to be monitored. If the extracted access feature matches a predetermined BF attack pattern, it is determined that a brute force attack has been performed on the accessed communication apparatus. That is, if a plurality of accesses in which their features are similar are detected, a communication apparatus that is the access destination of the plurality of accesses is determined to have had a brute force attack. Therefore, even if only one communication apparatus had a brute force attack, it can be detected. Therefore, it is possible to detect a brute force attack (login control-type BF attack) in a form in which login attempts are repeated only for one IP address (dstIP) while the IP address is changed.

Also, according to the first embodiment of the present disclosure, the IP address of a communication apparatus that had a login control-type BF attack is registered in the countermeasure-demanding dstIP list 109 and a BF attack for the communication apparatus is monitored with an emphasis on the BF attack. Therefore, it is possible to detect a login control-type BF attack at an early stage.

Furthermore, if a communication apparatus that has a login control-type BF attack is detected according to the current access situation for the communication apparatus 3, which is a target to be monitored, communication from one IP address of the transmission source (attack source), the IP address being used for the attack, is blocked. Therefore, it is possible to block a login control-type BF attack at an early stage.

In addition, a period during which a brute force attack (login attempts) from the attack source IP address is blocked is set, and after the elapse of the period, the blocking of login attempts from the attack source IP address is canceled. Therefore, it is possible to suppress an explosive increase in the number of srcIPs for which attacks are to be blocked. Thus, it is possible to suppress an increase in a processing load on the intrusion detection system/intrusion prevention system 2 and the like and thereby suppress damage and the like due to the increase in the processing load.

Incidentally, in the first embodiment, one network attack monitoring apparatus 1 having the attack extracting unit 100 and attack blocking unit 120 as illustrated in FIG. 4 has been taken as an example. However, the network attack monitoring apparatus according to the present disclosure is not limited to this. For example, the network attack monitoring apparatus may be an apparatus in which a first apparatus equivalent to the attack extracting unit 100 and a second apparatus equivalent to the attack blocking unit 120 are connected. Also, functions equivalent to the attack extracting unit 100 and attack blocking unit 120 may be disposed in the intrusion detection system/intrusion prevention system 2.

Also, acquisition of an access history (BF detection log 106) for the communication apparatus 3, which a target to be monitored, and the current access situation, the blocking of a login control-type BF attack by using the srcIP black list 123, and the like may be performed in a separate apparatus from the intrusion detection system/intrusion prevention system 2.

Also, a login attempt feature used to determine whether the attack is a login control-type BF attack is not limited to a combination of the total LT and variance VL of login attempts and the duration time DT in login attempt detection, which have been described above, and can of course be changed as appropriate.

Second Embodiment

In this embodiment, an example of another structure of the attack extracting unit in the network attack monitoring apparatus 1 and another method of obtaining the IP address (dstIP) of a communication apparatus that had a login control-type BF attack will be described.

Figure 12:
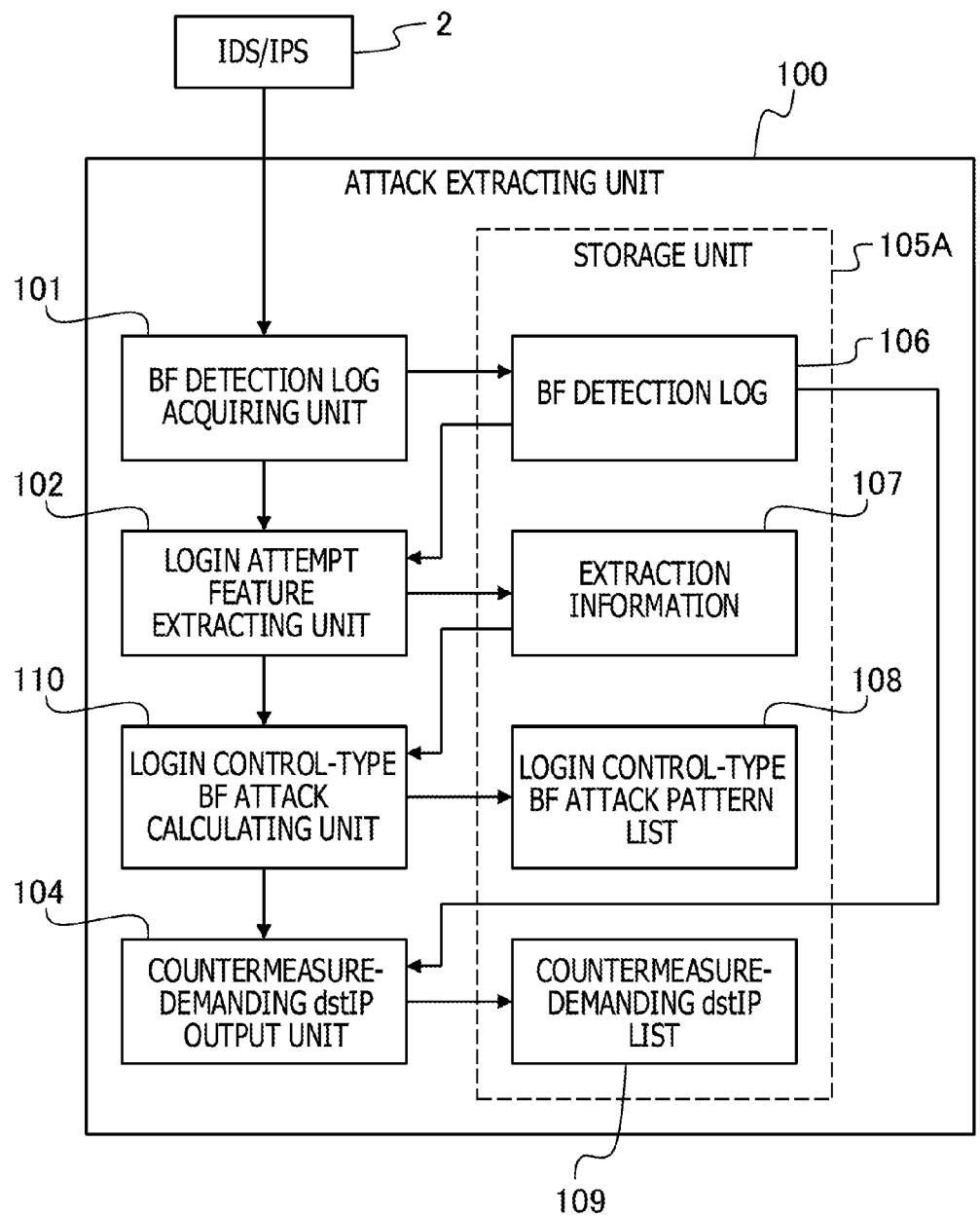
FIG. 12 is a schematic diagram that illustrates an example of the structure of an attack extracting unit in a network attack monitoring apparatus according to a second embodiment of the present disclosure.

FIG. 12 is a schematic diagram that illustrates an example of the structure of an attack extracting unit in a network attack monitoring apparatus according to the second embodiment of the present disclosure;

The network attack monitoring apparatus 1 in this embodiment has the attack extracting unit 100 and attack blocking unit 120 (see FIG. 4) as with the apparatus described in the first embodiment. Out of these, the structure of the attack blocking unit 120 is similar to the structure of the apparatus described in the first embodiment (see FIG. 7)

By contrast, the attack extracting unit 100 in the network attack monitoring apparatus 1 in this embodiment has the BF detection log acquiring unit 101, the login attempt feature extracting unit 102, a login control-type BF attack calculating unit 110, the countermeasure-demanding dstIP output unit 104, and the storage unit 105A, as illustrated in FIG. 12. The BF detection log 106, extraction information 107, login control-type BF attack pattern list 108, and countermeasure-demanding dstIP list 109 are stored in the storage unit 105A.

The BF detection log acquiring unit 101, login attempt feature extracting unit 102, and countermeasure-demanding dstIP output unit 104 in the attack extracting unit 100 are as described in the first embodiment. The BF detection log 106, extraction information 107, and countermeasure-demanding dstIP list 109 that are stored in the storage unit 105A are also as described in the first embodiment.

The login control-type BF attack calculating unit 110 classifies accesses into groups in each of which access features are similar according to an access history (BF detection log 106), and calculates a particular group including an access corresponding to a login control-type BF attack. In this embodiment, srcIPs are classified into groups according to the extraction information 107 extracted in the login attempt feature extracting unit 102 and an srcIP used in a login control-type BF attack is calculated. By, for example, clustering, srcIPs are classified into groups of srcIPs in each of which login attempt features are similar. In addition, a particular group is a group, in a plurality of groups, in which the number of srcIPs is larger than a predetermined number or the number of srcIPs is largest.

Also, the login control-type BF attack calculating unit 110 registers the calculated srcIP and the feature of the login attempt from the srcIP in the login control-type BF attack pattern list 108 in the storage unit 105A.

That is, the network attack monitoring apparatus 1 in this embodiment obtains, from the BF detection log 106, an srcIP from which a login control-type BF attack was performed, instead of performing a comparison with an attack pattern list prepared in advance, and determines whether or not there is a communication apparatus that had a login control-type BF attack. If there is a communication apparatus that had a login control-type BF attack, the network attack monitoring apparatus 1 registers the communication apparatus in the countermeasure-demanding dstIP list 109 and monitors subsequent accesses.

Figure 13:
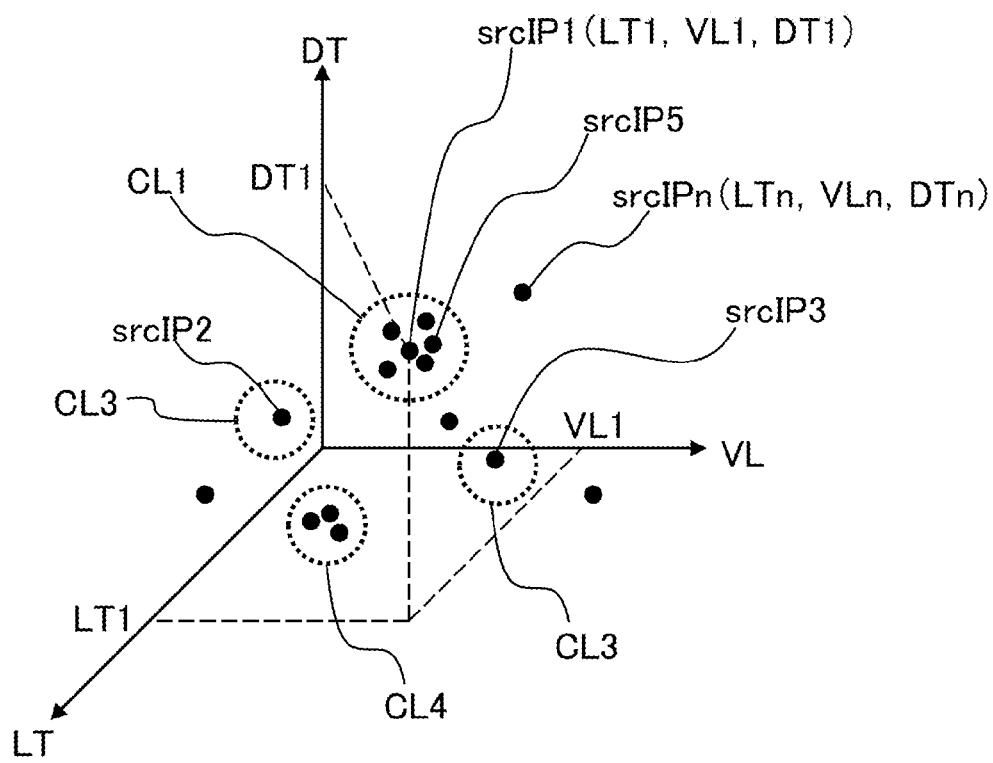
FIG. 13 is a schematic diagram that explains a method of srcIP clustering.

FIG. 13 is a schematic diagram that explains a method of srcIP clustering.

The login control-type BF attack calculating unit 110 classifies srcIPs in the extraction information 107 as illustrated in FIG. 6B into groups of srcIPs in each of which login attempt features are similar. This classification into groups is performed by clustering in which the feature of a login attempt from each srcIP is used. In this case, the login control-type BF attack calculating unit 110 plots values (LTn, VLn, DTn) for each srcIPn in a three-dimensional orthogonal coordinate system in which the total LT and variance VL of login attempts and the duration time DT in login attempt detection are axes as illustrated in, for example, FIG. 13. After values for each srcIPn have been plotted, srcIPs for which the distances of values (LTn, VLn, DTn) representing a login attempt feature are within a predetermined range are grouped and classified as one of clusters CL1, CL2, CL3, and so on. After that, out of the clusters CL1, CL2, and so on, a particular cluster (group) that includes srcIPs the number of which satisfies a predetermined condition is extracted and registered in the login control-type BF attack pattern list 108.

Incidentally, clustering may be performed by using a known method, which is, for example, a partitioning optimization method such as the K-means method (non-hierarchical method) or a hierarchical method such as the nearest neighbor method.

Also, a condition in the extraction of a particular cluster may be set as appropriate. The simplest examples include the condition that, out of the all clusters, a cluster including a largest number of srcIPs is extracted. Also, for example, the condition may be set that, out of the all clusters, clusters including a predetermined number of srcIPs or more (for example, five srcIPs or more) are extracted. Furthermore, the condition may be set that, out of the all clusters, clusters including a predetermined number of srcIPs or more are extracted if times of the day at which login attempts were performed by using these srcIPs are deviated at certain time intervals or according to a predetermined rule.

In the attack pattern (login attempts) of a login control-type BF attack, login attempts are repeated only for one IP address (dstIP) while the IP address is changed. The features of these login attempts are as described in the first embodiment. That is, a login attempt by each srcIP has the feature that the total LT and variance VL of login attempts and the duration time DT are almost the same. Therefore, by clustering as described above, srcIPs that were used in a login control-type BF attack and an attack pattern can be registered in the login control-type BF attack pattern list 108.

Also, the extraction information 107 is a login attempt feature extracted from the latest BF detection log 106 acquired from the intrusion detection system/intrusion prevention system 2. That is, the attack blocking unit 120 (attack inspecting unit 121) in the network attack monitoring apparatus 1 according to this embodiment can determine whether or not there is a login control-type BF attack by using the login control-type BF attack pattern list 108 based on the latest BF detection log 106. Therefore, in the network attack monitoring apparatus 1 according to this embodiment, it is also possible to detect, for example, a login control-type BF attack in an attack pattern that is not recognized by the manager of the network attack monitoring apparatus 1 or another person at an early stage and block the attack.

Figure 14A:
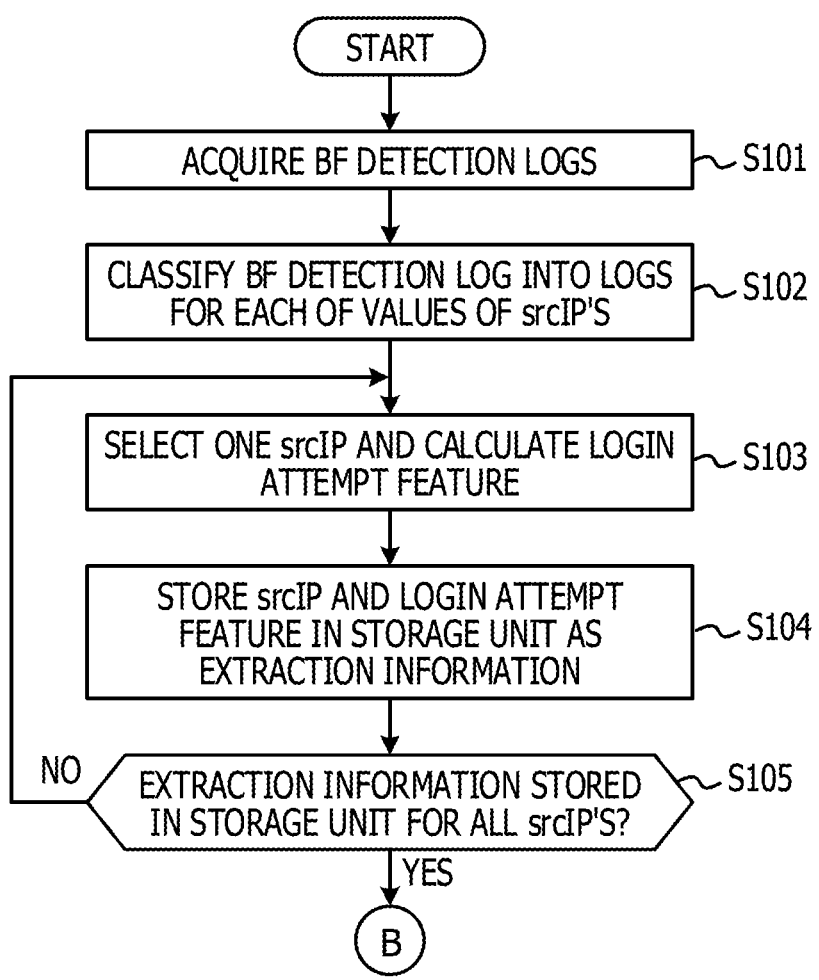
FIGS. 14A and 14B are a flowchart that illustrates processing performed by the attack extracting unit in the network attack monitoring apparatus according to the second embodiment.
Figure 14B:
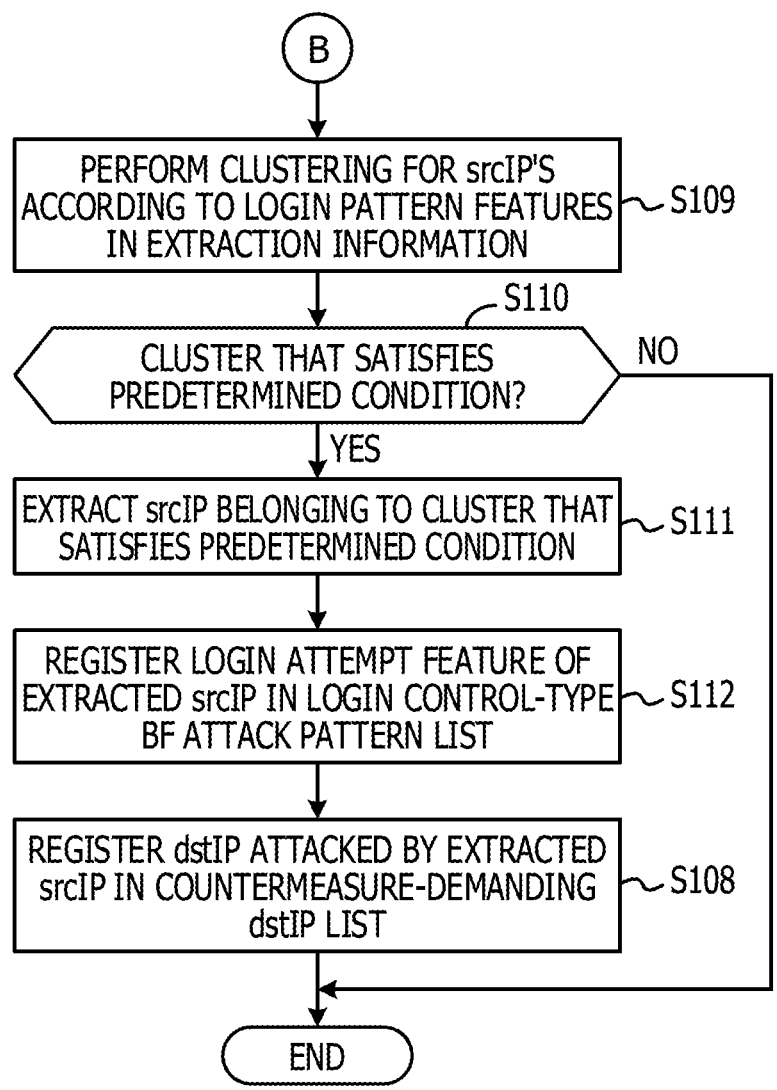

FIG. 14A is a flowchart (1) that illustrates processing performed by the attack extracting unit in the network attack monitoring apparatus according to the second embodiment. FIG. 14B is a flowchart (2) that illustrates processing performed by the attack extracting unit in the network attack monitoring apparatus according to the second embodiment.

The attack extracting unit 100 in the network attack monitoring apparatus 1 according to this embodiment repeatedly executes processing as illustrated in FIGS. 14A and 14B according to a preset schedule. Although processing performed by the attack extracting unit 100 according to this embodiment will be described below, specific descriptions about portions overlapping in the descriptions in the first embodiment will be omitted.

First, the BF detection log acquiring unit 101 acquires the BF detection log 106 from the intrusion detection system/intrusion prevention system 2 and stores the BF detection log 106 in the storage unit 105A (step S101).

Next, the login attempt feature extracting unit 102 reads out the BF detection log 106 in the storage unit 105A and classifies the BF detection log 106 into logs for each of the values of the IP addresses (srcIPs) of communication sources (step S102).

Next, the login attempt feature extracting unit 102 selects one srcIP in the classified logs and calculates a login attempt feature (step S103). In this case, as the login attempt feature, the login attempt feature extracting unit 102 calculates the total LT and variance VL of login attempts and the duration time DT in login attempt detection as illustrated in FIG. 4B.

Next, the login attempt feature extracting unit 102 associates the selected srcIP and calculated login attempt feature with each other and stores them in the storage unit 105A as the extraction information 107 (step S104).

Upon the termination of the processing in step S104, the login attempt feature extracting unit 102 then checks whether extraction information has been stored in the storage unit 105A for all srcIPs (step S105). If there is an srcIP for which extraction information has not been stored (step S105; No), the processing returns to step S103.

After extraction information has been stored in the storage unit 105A for all srcIPs (step S105; Yes), the login control-type BF attack calculating unit 110 then performs clustering for the srcIPs according to the login pattern features in the extraction information 107 (step S109). The clustering for the srcIPs may be performed by using any of the known clustering methods, as described above.

Upon the termination of the processing in step S109, the login control-type BF attack calculating unit 110 then decides whether or not there is a cluster that satisfies a predetermined condition (step S110). In step S110, it is decided, for example, whether or not the number of srcIPs in the cluster including a maximum number of srcIPs is equal to or greater than a threshold. Also, a decision may be added to step S110 as to, for example, whether times of the day at which srcIPs included in one cluster were detected are deviated at certain time intervals or according to a predetermined rule.

If there is no cluster that satisfies the predetermined condition (step S110; No), it is determined that there is no login control-type BF attack and processing is terminated.

By contrast, if there is a cluster that satisfies the predetermined condition (step S110; Yes), the login control-type BF attack calculating unit 110 then extracts an srcIP belonging to a cluster that satisfies the predetermined condition (step S111).

Next, the login control-type BF attack calculating unit 110 registers the feature of the login attempt performed by using the extracted srcIP in the login control-type BF attack pattern list 108 in correspondence to the srcIP (step S112).

Upon the termination of the processing in step S112, finally, the countermeasure-demanding dstIP output unit 104 registers, in the countermeasure-demanding dstIP list 109, the IP address (dstIP) that had a BF attack in which the extracted srcIP was used (step S108).

As described above, by calculating a login control-type BF attack pattern according to the login attempt feature calculated for each srcIP (attack source IP address) in the BF detection log 106, even if only one dstIP address had a login control-type BF attack, the dstIP address can be identified.

Moreover, since a login control-type BF attack pattern is calculated according to the extraction information 107 (latest BF detection log 106), it is also possible to detect a login control-type BF attack in an attack pattern that is not recognized by the manager of the network attack monitoring apparatus 1 or another person at an early stage and block the attack.

Furthermore, since an srcIP included in a cluster that satisfies a predetermined condition, the cluster being one of clusters obtained by clustering, is extracted as an srcIP that was used in a login control-type BF attack, it is possible to control srcIPs extracted by changing a condition and also control attack patterns. For example, besides the number of srcIPs included in a cluster, if it is also set as a condition that times at which login attempts were performed by using each srcIP are deviated at certain time intervals or according to a predetermined rule, it is possible to extract an srcIP for which a login attempt feature is close to an actual login control-type BF attack. Therefore, an srcIP and dstIP involved in a login control-type BF attack can be precisely extracted.

As described above, according to the second embodiment of the present disclosure, it is possible to detect a brute force attack (login control-type BF attack) in a form in which login attempts are repeated only for one IP address (dstIP) while the IP address is changed.

Also, according to the second embodiment of the present disclosure, the IP address of a communication apparatus that had a login control-type BF attack is registered in the countermeasure-demanding dstIP list 109 and a BF attack for the communication apparatus is monitored with an emphasis on the BF attack. Therefore, it is possible to detect a login control-type BF attack at an early stage.

Furthermore, if a communication apparatus that has a login control-type BF attack is detected according to the current access situation for the communication apparatus 3, which is a target to be monitored, communication from the IP address of the transmission source (attack source), the IP address being used for the attack, is blocked. Therefore, it is possible to block a login control-type BF attack at an early stage.

In addition, since the srcIP and attack pattern that were calculated according to the latest BF detection log 106 are registered in the login control-type BF attack pattern list 108, it is also possible to detect a login control-type BF attack in an attack pattern that is not recognized by the manager or another person at an early stage and block the attack.

Incidentally, in the second embodiment, srcIPs have been classified into groups by clustering, and an srcIP and attack pattern (login attempt feature) that are to be registered in the login control-type BF attack pattern list 108 have been selected. However, classification of srcIPs into groups is not limited to clustering; the classification may of course be performed by another method.

Also, in the second embodiment, an srcIP from which a login control-type BF attack was performed is obtained from the extraction information 107 (BF detection log 106) (see FIGS. 12 and 14B). Then, the feature of a login attempt with the srcIP obtained from the extraction information 107 is registered in the login control-type BF attack pattern list 108 and is then used in inspection as to whether or not the communication apparatus 3 has a subsequent attack.

In the present disclosure, however, this is not a limitation. For example, the manager of the network attack monitoring apparatus 1 or another person may add a new attack pattern to the login control-type BF attack pattern list 108 at any time. In this case, a comparison with the attack pattern added by the manger or other person may be added to a determination in the attack extracting unit 100 as to whether there is a communication apparatus that had a login control-type BF attack.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus, comprising:
a memory configured to store history information indicating login attempts from source addresses to destination addresses; and
a processor coupled to the memory and configured to:
refer to a first series of sequential login attempts executed from a first source address to a destination address and a second series of sequential login attempts executed from a second source address to the destination address in the history information,
determine whether a first difference between a first number of login attempts included in the first series of sequential login attempts and a second number of login attempts included in the second series of sequential login attempts is no more than a first threshold,
determine whether a second difference between a first time length during which the first series of sequential login attempts has been executed and a second time length during which the second series of sequential login attempts has been executed is no more than a second threshold,
detect that a specific attack from a plurality of source addresses to a destination address is executed when it is determined that the first difference and the second difference are no more than the first threshold and the second threshold respectively, the plurality of source addresses including the first source address and the second source address, and
store attack information indicating the specific attack to the memory.

2. The monitoring apparatus according to claim 1, wherein the specific attack is a brute force attack.

3. The monitoring apparatus according to claim 1, wherein a difference between a first variance and a second variance is within a third threshold, the first variance being a difference between the first number of login attempts and a third number of login attempts included in a third series of sequential login attempts executed from the first source address to the destination address, the second variance being a difference between the second number of login attempts and a fourth number of login sequential attempts included in a forth series of login attempts executed from the second source address to the destination address.

4. The monitoring apparatus according to claim 1, wherein the plurality of source addresses include a third source address, a difference between the first number of login attempts and a third number of login attempts included in a third series of sequential login attempts executed from the third source address to the destination address being within the first threshold, a difference between the first time length and a third time length during which the third series of sequential login attempts has been executed is not more than the second threshold.

5. The monitoring apparatus according to claim 1, wherein the plurality of source addresses are determined by clustering the first series of login attempts and the second series of login attempts from among a plurality of series of login attempts based on the history information.

6. The monitoring apparatus according to claim 1, wherein determinations by the processor are triggered when a new login attempt on the destination address is detected.

7. The monitoring apparatus according to claim 6, wherein, when the specific attack is detected, the processor is configured to block following accesses from the first source address to the destination address.

8. The monitoring apparatus according to claim 6, wherein the processor is configured to set a blocking period during which the following accesses from the first source address to the destination address are blocked.

9. The monitoring apparatus according to claim 8, wherein, after the blocking period elapses, the processor is configured to cancel blocking the following accesses from the first source address to the destination address.

10. The monitoring apparatus according to claim 1, wherein the plurality of source addresses and the destination address are IP addresses.

11. A monitoring method, comprising:
storing history information indicating login attempts from source addresses to destination addresses;
referring, with a processor, to a first series of sequential login attempts executed from a first source address to a destination address and a second series of sequential login attempts executed from a second source address to the destination address in the history information;
determining, with the processor, whether a first difference between a first number of login attempts included in the first series of sequential login attempts and a second number of login attempts included in the second series of sequential login attempts is no more than a first threshold;
determining, with the processor, whether a second difference between a first time length during which the first series of sequential login attempts has been executed and a second time length during which the second series of sequential login attempts has been executed is no more than a second threshold;
detecting, by the processor, that a specific attack from a plurality of source addresses to a destination address is executed when it is determined that the first difference and the second difference are no more than the first threshold and the second threshold respectively, the plurality of source addresses including the first source address and the second source address; and
storing attack information indicating the specific attack to the memory.

12. The monitoring method according to claim 11, wherein the specific attack is a brute force attack.

13. The monitoring method according to claim 11, wherein a difference between a first variance and a second variance is within a third threshold, the first variance being a difference between the first number of login attempts and a third number of login attempts included in a third series of sequential login attempts executed from the first source address to the destination address, the second variance being a difference between the second number of login attempts and a fourth number of login sequential attempts included in a forth series of login attempts executed from the second source address to the destination address.

14. The monitoring method according to claim 11, wherein the plurality of source addresses include a third source address, a difference between the first number of login attempts and a third number of login attempts included in a third series of sequential login attempts executed from the third source address to the destination address being within the first threshold, a difference between the first time length and a third time length during which the third series of sequential login attempts has been executed is not more than the second threshold.

15. The monitoring method according to claim 11, wherein the plurality of source addresses are determined by clustering the first series of login attempts and the second series of login attempts from among a plurality of series of login attempts based on the history information.

16. The monitoring method according to claim 11, wherein the determinations by the processor are triggered when a new login attempt on the destination address is detected.

17. The monitoring method according to claim 16, wherein when the specific attack is detected, blocking following accesses from the first source address to the destination address.

18. The monitoring method according to claim 11, wherein the plurality of the source addresses and the destination address are IP addresses.

* * * * *